(12) United States Patent
Bauch et al.

(10) Patent No.: US 11,035,413 B1
(45) Date of Patent: Jun. 15, 2021

(54) BEARING WITH CONDUCTIVE MEDIUM

(71) Applicant: Aktiebolaget SKF, Gothenburg (SE)

(72) Inventors: Riad Bauch, Gerbrunn (DE); Mathieu Hubert, Turin (IT); Karl Preis, Traun (AT); Igor Dorrestijn, Woerden (NL)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 16/739,808

(22) Filed: Jan. 10, 2020

(51) Int. Cl.
*F16C 41/00* (2006.01)
*F16C 33/78* (2006.01)
*F16C 33/58* (2006.01)

(52) U.S. Cl.
CPC .......... *F16C 41/002* (2013.01); *F16C 33/585* (2013.01); *F16C 33/7853* (2013.01); *F16C 2202/34* (2013.01)

(58) Field of Classification Search
CPC .. F16C 19/52; F16C 33/7853; F16C 33/7863; F16C 41/002
See application file for complete search history.

(56) References Cited

U.S. PATENT DOCUMENTS

| 6,109,794 A | 8/2000 | Bertetti et al. |
| 6,589,918 B2 | 7/2003 | Denpo et al. |
| 6,755,572 B1 * | 6/2004 | Kinbara .................. F16C 19/52 384/462 |
| 9,790,995 B2 | 10/2017 | White et al. |
| 10,578,164 B1 * | 3/2020 | Zhong ..................... F16C 19/06 |

FOREIGN PATENT DOCUMENTS

| DE | 102017100547 | 7/2017 | |
| FR | 2913543 A1 * | 9/2008 | ............ F16C 41/002 |
| WO | WO-2020001674 A1 * | 1/2020 | .............. F16C 19/52 |

* cited by examiner

*Primary Examiner* — Phillip A Johnson
(74) *Attorney, Agent, or Firm* — Reed Smith LLP

(57) ABSTRACT

A bearing assembly having a conductive medium. The bearing unit is mountable on a shaft and includes a bearing unit including a radially inner bearing ring including a radially inner race, wherein the radially inner bearing ring is rotatable with the shaft. The bearing unit further includes a radially outer bearing rings including a radially outer race, wherein the radially outer bearing ring is stationary with respect to the shaft; and a plurality of rolling elements supported to roll between the radially inner race of the radially inner bearing ring and the radially outer race of the radially outer bearing ring. An annular chamber body is disposed adjacent the bearing unit. A conductive medium is disposed within the chamber body.

14 Claims, 4 Drawing Sheets

BEARING WITH CONDUCTIVE MEDIUM

TECHNICAL FIELD

This disclosure is generally directed to a bearing technology, and in particular, although not exclusively, for a bearing assembly including a conductive medium.

BACKGROUND

The use of rolling bearings in electric motors can lead to the passage of current. Pulses from inverters can cause tensions between the bearing rings of the roller bearings. The currents can lead to electrical continuity damage to the rolling elements and bearing raceways from spark or electrical erosion. Electrical erosion may cause damage, such as removal of material, to contact surfaces from the passage of electric currents. As a result, the bearing can fail significantly prematurely and cause the failure of the entire machine. This leads to repair costs and costs due to failure.

Known solutions include hybrid bearings, coated bearing and insulated bushing. Also, separate grounding rings are often used, for example, wave grounding systems such as spring loaded graphite brush and carbon fiber rings. The grounding rings are used to protect the rolling bearings from damage. These are separate components that are often attached by crimping or screwing on the housing. These work with brushes and are only partially designed for life. Partly due to contamination in the machine to failure. These systems always have additional installation effort and space requirements and costs. Brushes add friction and contamination as brushes degrade, and also limit speed.

DETAILED DESCRIPTION

A bearing assembly in accordance with this disclosure is suitable for bearing units, in particular rolling bearings. The exemplary embodiments disclosed herein are suitable in particular, although not exclusively, for bearing units of electric motors such as automotive traction motors, said bearing units being provided on a shaft.

Exemplary embodiments disclosed herein reduce wear particles and friction, which extends the life of the bearing unit. Exemplary embodiments may also run at higher speeds due to the reduced friction.

Purely by way of a non-limiting example, inventive concepts of exemplary embodiments will now be described with reference to a bearing assembly on a rotating shaft. Exemplary embodiments create electrical conductivity between the rotating parts and the non-rotating parts.

Figure 1:
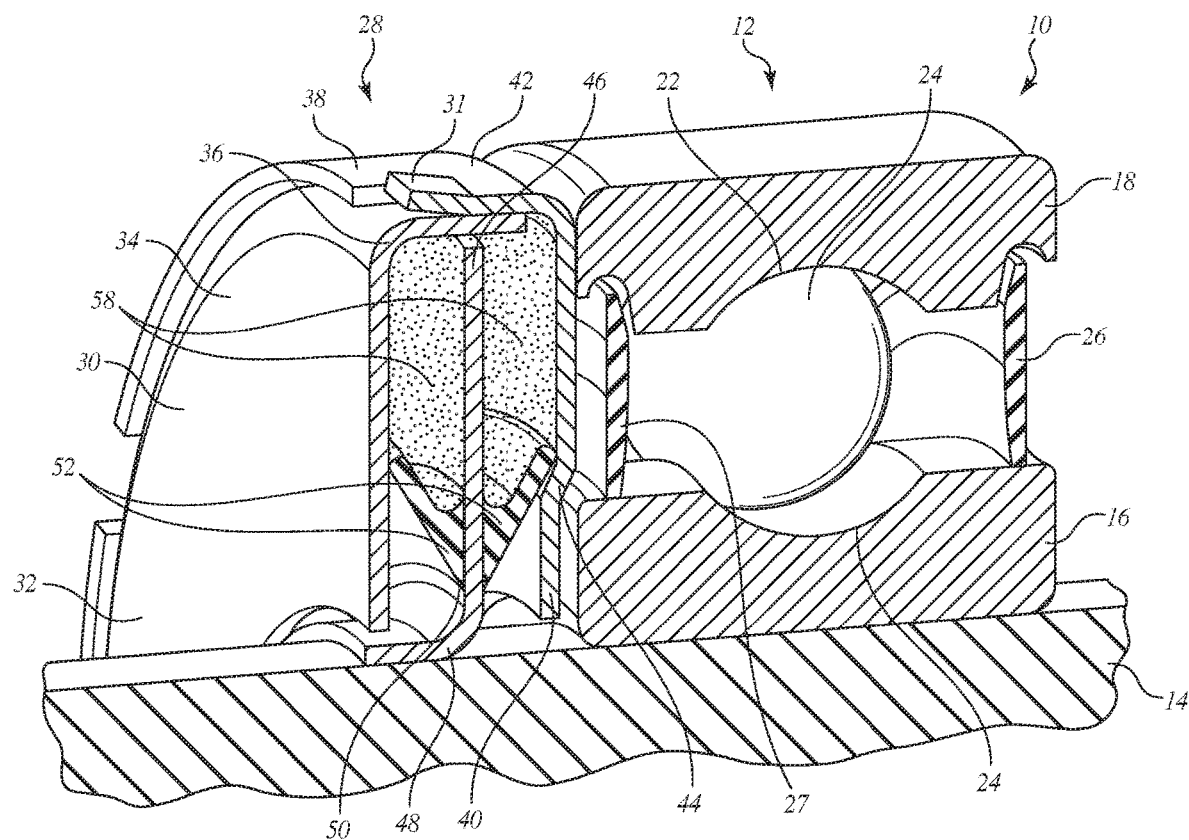
FIG. 1 is a cross-section through a bearing assembly and shaft according to an exemplary embodiment.

With reference to FIG. 1, a bearing assembly in accordance with exemplary embodiments is denoted overall by 10 and includes a bearing unit 12 mounted on a rotatable shaft 14. In the whole of the present description and in the claims, the terms and expressions indicating positions and orientations such as "radial" and "axial" are understood as referring to the central axis of rotation X of bearing unit 12 and shaft 14. The figure shows a detail of the configuration provided by way of example.

Bearing unit 12 has a radially inner bearing ring 16 which is mounted on and rotatable with shaft 14. Bearing unit 12 further comprises a radially outer bearing ring 18 which is stationary relative to inner bearing ring 16 and shaft 14. Radially inner bearing ring 16 includes a radially inner raceway 20 and radially outer bearing ring 18 includes a radially outer raceway 22. A plurality of rolling elements 24 are supported to roll between radially inner raceway 20 and radially outer raceway 22. Rolling elements 24 may be stainless steel balls or the like. A first seal member 26 and a second seal member 27 are fixed to or unitary with radially inner bearing ring 16 and extend radially outwardly from radially inner bearing ring 16 towards radially outer bearing ring 18 on either side of radially inner raceway 20 and radially outer raceway 22. Alternatively, first seal member 26 and second seal member 27 may be fixed to or unitary with radially outer bearing ring 18 and extend radially inwardly from radially outer bearing ring 18 towards radially inner bearing ring 16.

The embodiment of FIG. 1 further includes an annular cassette 28 which is mountable on shaft 14 adjacent to bearing unit 12. Cassette 28 has an interior chamber having a chamber body formed by a cassette shell 30 which is stationary with respect to shaft 14. Shell 30 may include a first body portion 32 and a second body portion 38 which are configured to be attached to each other by openable locking elements 31 which allow first body portion 32 and second body portion 38 to be releasably attached to each other. First body portion 32 has a first radial wall portion 34 and a first axial wall portion 36, and second body portion 38 has a second radial wall portion 40 and a second axial portion 42. Second radial wall portion 40 may be configured to have a fitting portion 44 which is configured to be press fit to radially inner bearing ring 16 and radially outer bearing ring 18 so that it is stationary with radially outer bearing ring 18. The entire bearing assembly 10 including bearing unit 12 and cassette 28 may be pressed onto shaft 14 as a unit after shell 30 is press fit to bearing assembly 10 or may be press fit separately onto shaft 14. Shell 30 may be made from any suitable material including electrically conductive material such as stainless steel, steel and aluminum.

Cassette 28 further includes an annular flinger ring 46 disposed within shell 30 and configured to have an L-shaped cross-section having an axial flinger ring portion 48 and a radial flinger ring portion 50. Axial flinger ring portion 48 is configured to be press fit on to shaft 14 so that flinger ring 46 is rotatable with shaft 14. Flinger ring 46 further has two seal lips 52 which extend at an angle from opposite sides of radial flinger ring portion 50. Seal lips 52 may be made from any suitable material such as vulcanized rubber and may be attached to radial flinger ring portion 50 by overmolding or gluing. Seal lips 52 may also be made of suitable polymers depending on the performance specifications. For example, seal lips 52 may be made from nitril rubber (NBR) and hydrogenated nitril rubber (HNBR) for lower performance (low speed/low temperature—125° C.); fluoroelastomers or fluorocarbons (FKM) for high performance (high speed/high temperature—150° C.); and polytetrafluoroethylene (PTFE) for very high performance (very high speed and temperature—175° C.).

Cassette 28 is configured to hold a conductive medium 58. Conductive medium 58 may be a conductive paste, fluid, grease, granules, gel or other medium. Conductive medium 58 may further be an ionic liquid, conductive fat, or oil based matrix. Conductive material may as a poor lubricant while good lubricants typically have low conductivity. Thus, a balance may be achieved by using a non-conductive material with conductive particles dispersed throughout. Conductive medium 58 is kept inside cassette 28 by seal lips 52 and is disposed above seal lips 52.

Figure 2:
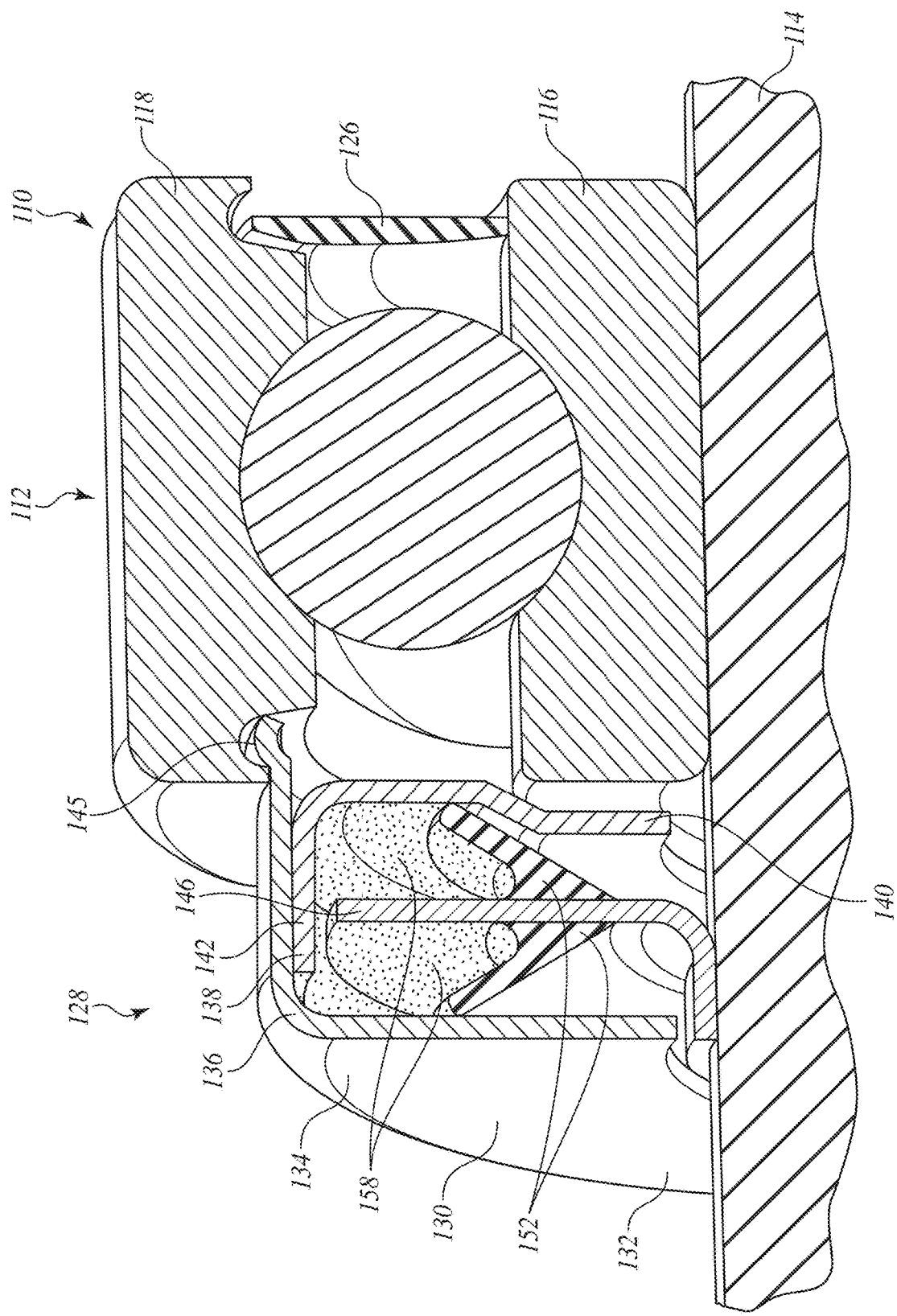
FIG. 2 is a cross-section through a bearing assembly and shaft according to another exemplary embodiment.

Referring to FIG. 2, another exemplary embodiment of a bearing assembly 110 is shown. For the sake of simplicity, like or similar elements in alternative embodiments will be referenced by the same reference numeral as earlier embodiments advanced by multiples of one hundred. A cassette 128 is integrally formed with bearing unit 112. Cassette 128 includes a cassette shell 130 which is stationary with respect to shaft 114. Shell 130 may include a first body portion 132 and a second body portion 138. First body portion 132 has a first radial wall portion 134 and a first axial wall portion 136, and second body portion 138 has a second radial wall portion 140 and a second axial portion 142. First radial wall portion 134 may be configured to have a fitting portion 145 which is configured to be press fit to radially outer bearing ring 118 so that it is stationary with radially outer bearing ring 118. The entire bearing assembly 110 may be pressed onto shaft 114 as a unit. A first seal member 126 is fixed to or unitary with radially inner bearing ring 116. A second seal member is not provided. Cassette 128 further includes an annular flinger ring 146, sealing lips 152 and a conductive medium 158 as before.

Figure 3:
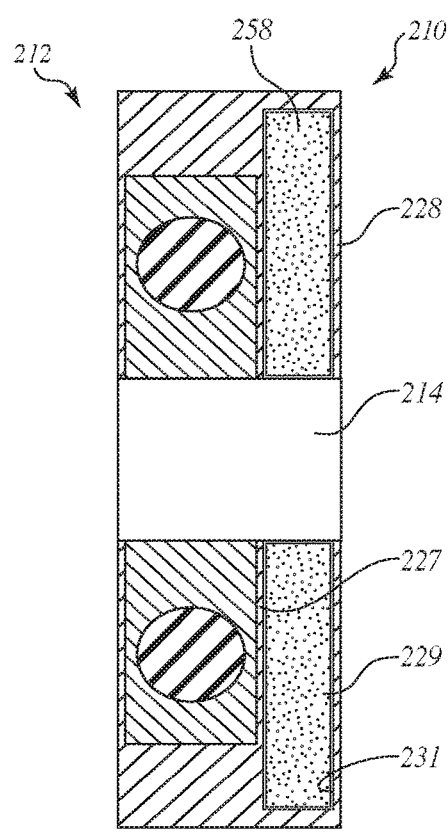
FIG. 3 is a cross-section through a bearing assembly according to another exemplary embodiment.

Referring to FIG. 3, another exemplary embodiment of a bearing assembly 210 is shown on a shaft 214. In this embodiment, a bearing assembly 210 includes a sealed chamber body 228 integrally formed with a bearing unit 212 wherein the cassette is separated from bearing unit 212 by a seal 227. Sealed chamber body 228 is an annular chamber at least partially filled with a conductive medium 258.

Figure 4:
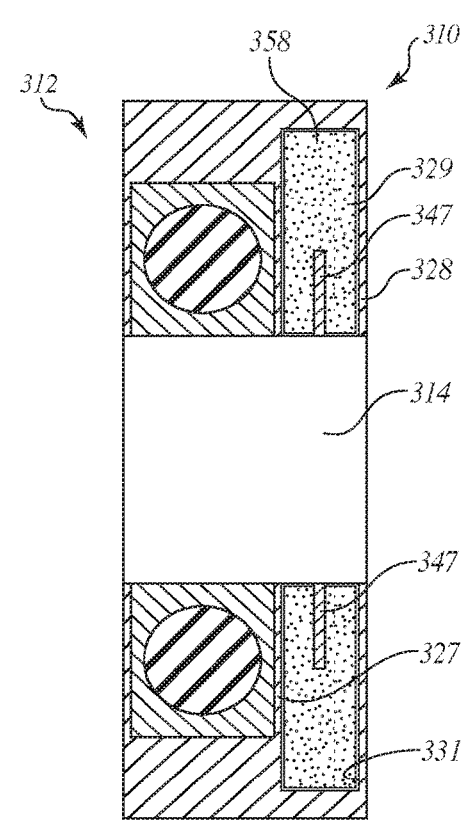
FIG. 4 is a cross-section through a bearing assembly according to another exemplary embodiment.

Referring to FIG. 4, another exemplary embodiment of a bearing assembly 310 is shown. Bearing assembly 310 includes a sealed chamber body 328 integrally formed with a bearing unit 312 wherein 328 is an annular chamber at least partially filled with a conductive medium 358. Sealed chamber body 328 further includes an internal annular ring 347 which rotates with shaft 314.

In the embodiments of FIGS. 3 and 4, no space for further components is needed so bearing assemblies 210 and 310 may be used in tight spaces. Sealed chambers 228 and 328 may be sealed to keep in conductive medium 258, 358. An additional seal 229, 329 may be utilized to coat the interior walls 231, 331 of sealed chambers 228 and 328. Additional seal 229, 329 may also include a conductive medium such as copper, aluminium or silver to provide additional conductivity.

Figure 5:
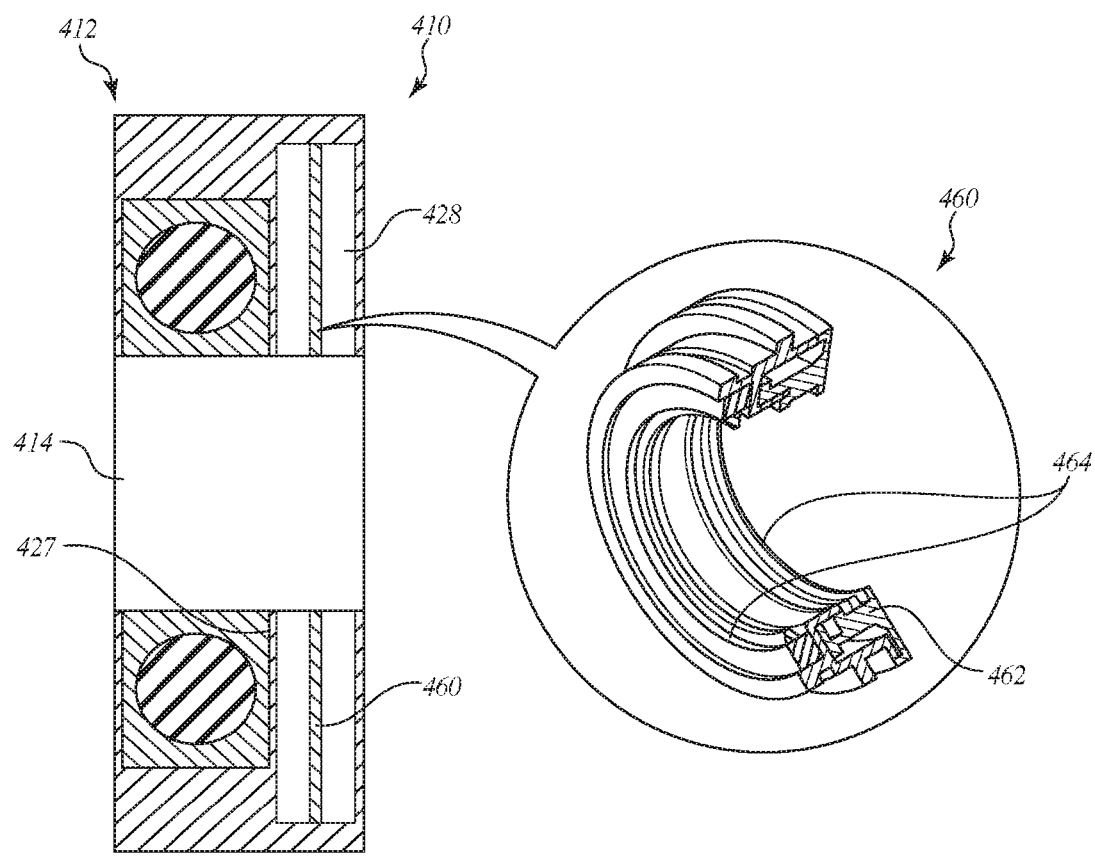
FIG. 5 is a cross-section through a bearing assembly including a disk-shaped laminar brush according to another exemplary embodiment.

Referring to FIG. 5, another exemplary embodiment of a bearing assembly 410 is shown. Bearing assembly 410 includes a sealed chamber body 428 integrally formed with a bearing unit 412 wherein sealed chamber body 428 is separated from bearing unit 412 by a seal 427 and may include an additional seal such as that described with respect to FIGS. 3 and 4. A disk-shaped device such a disk-shaped laminar grounding brush 460 similar to a ground ring is provided within sealed chamber body 428 and rotatable with shaft 414. Grounding brush 460 may include conductive brush filaments 462 sandwiched between conductive rings 464 and may be of the type disclosed in U.S. Pat. No. 9,790,995 entitled Bearing Seal with Integrated Grounding Brush, the disclosure of which is incorporated by reference herein. Alternatively, sealed chamber body 428 may be filled with a kind of metal wool of conductive metal such as copper wool or silver wool which ensures an electrically conductive connection between rotating and station parts of bearing unit 412. To increase the conductivity of the bearing unit, the bearing unit rotating and station parts can still be coated with conductive material, for example silver.

Further preferred and/or particularly advantageous of exemplary embodiments of inventive concepts are described in accordance with the characteristic features indicated in the attached dependent claims.

What is claimed is:

1. A bearing assembly mountable on a shaft comprising:
a bearing unit comprising:
a radially inner bearing ring including a radially inner race, wherein the radially inner bearing ring is rotatable with the shaft;
a radially outer bearing ring including a radially outer race, wherein the radially outer bearing ring is stationary with respect to the shaft; and
a plurality of rolling elements supported to roll between the radially inner race of the radially inner bearing ring and the radially outer race of the radially outer bearing ring;
an annular chamber body disposed adjacent the bearing unit;
a conductive medium disposed within the chamber body;
wherein the chamber body is formed by a shell of an annular cassette, wherein the shell is stationary with respect to the shaft.

2. The bearing assembly of claim 1, wherein the annular cassette is configured to be press fit to the bearing unit.

3. The bearing assembly of claim 1, wherein the annular cassette comprises a first body portion and a second body portion configured to be attached to the first body portion.

4. The bearing assembly of claim 3, wherein the first body portion has a first radial wall portion and a first axial wall portion, and the second body portion has a second radial wall portion and a second radial axial portion.

5. The bearing assembly of claim 4, wherein one of the first radial wall portion and the second radial wall portion is configured to be press fit with the bearing unit.

6. The bearing assembly of claim 4, wherein one of the first axial wall portion and the second axial wall portion is configured to be press fit with the bearing unit.

7. The bearing assembly of claim 1, further comprising a flinger disposed within the shell and configured to rotate with the shaft.

8. The bearing assembly of claim 7, wherein the flinger comprises an axial flinger ring portion and a radial flinger ring portion, wherein the axial flinger ring portion is configured to be press fit on to the shaft.

9. The bearing assembly of claim 8, further comprising at least one sealing lip disposed on the radial flinger ring portion.

10. The bearing assembly of claim 1, further comprising a seal member disposed between the chamber body and the bearing unit.

11. The bearing assembly of claim 1, wherein the conductive medium is selected from a conductive paste, a fluid, a grease, granules, an ionic liquid, fat, and an oil based matrix.

12. The bearing assembly of claim 1, wherein the conductive medium is formed from a non-conductive material having a conductive material dispersed throughout.

13. A bearing assembly mountable on a shaft comprising:
a bearing unit comprising:
a radially inner bearing ring including a radially inner race, wherein the radially inner bearing ring is rotatable with the shaft;
a radially outer bearing ring including a radially outer race, wherein the radially outer bearing ring is stationary with respect to the shaft; and
a plurality of rolling elements supported to roll between the radially inner race of the radially inner bearing ring and the radially outer race of the radially outer bearing ring;
an annular chamber body disposed adjacent the bearing unit;
a conductive medium disposed within the chamber body;
a seal member disposed between the chamber body and the bearing unit;
wherein the chamber body has an interior wall, wherein the interior wall is coated with a conductive seal.

14. A bearing assembly mountable on a shaft comprising:
a bearing unit comprising:
a radially inner bearing ring including a radially inner race, wherein the radially inner bearing ring is rotatable with the shaft;
a radially outer bearing ring including a radially outer race, wherein the radially outer bearing ring is stationary with respect to the shaft; and
a plurality of rolling elements supported to roll between the radially inner race of the radially inner bearing ring and the radially outer race of the radially outer bearing ring;
an annular chamber body disposed adjacent the bearing unit;
a conductive medium disposed within the chamber body;
wherein the conductive medium is formed from conductive brush filaments of a grounding brush disposed within the chamber and configured to rotate with the shaft.

* * * * *